O. P. CANADAY.
LIQUID DISPENSING DEVICE.
APPLICATION FILED FEB. 4, 1916.
1,221,288.
Patented Apr. 3, 1917.
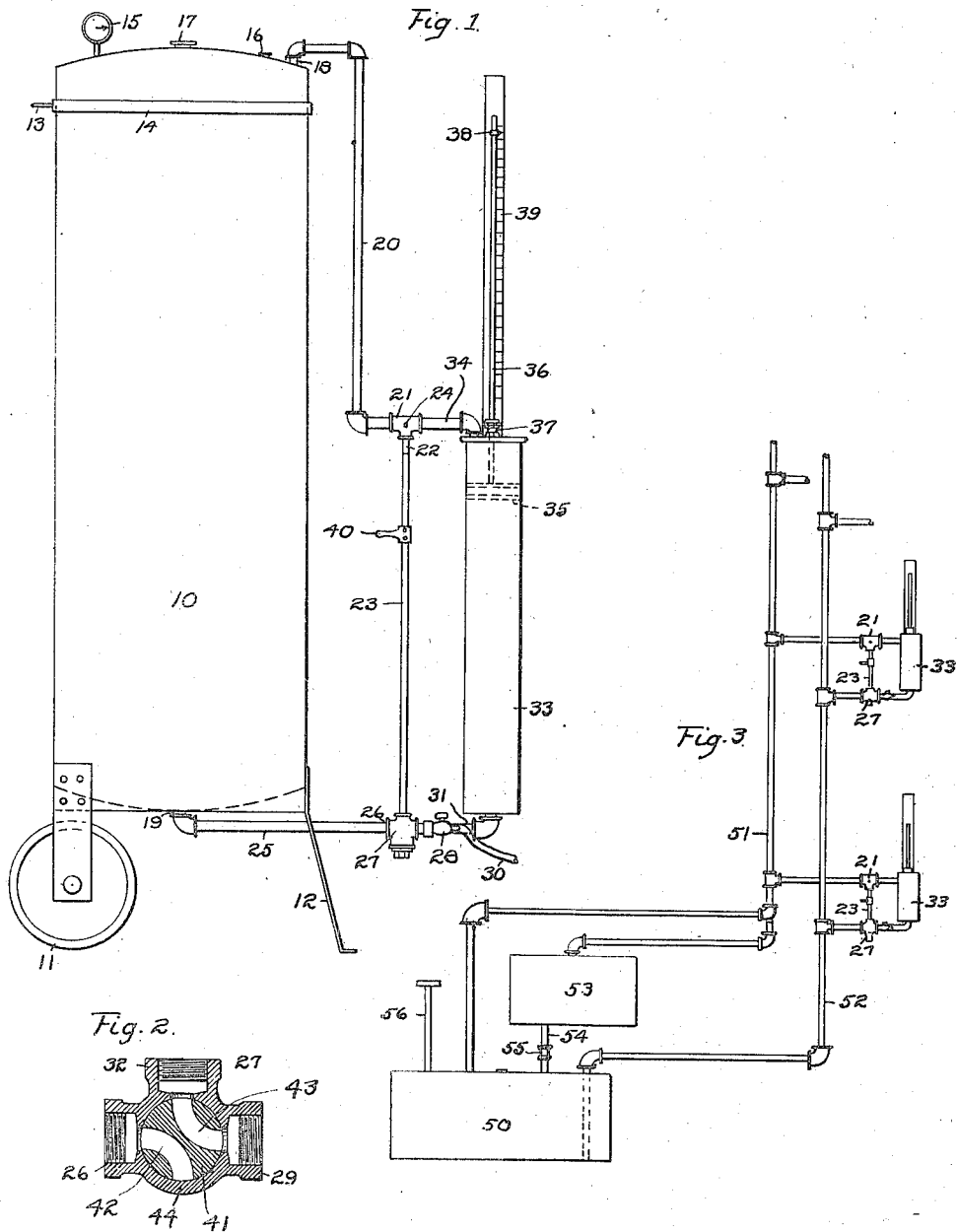
INVENTOR.
Orpha P. Canaday
BY Taylor & Hulse
ATTORNEYS.

UNITED STATES PATENT OFFICE.

ORPHA P. CANADAY, OF FORT WAYNE, INDIANA.

LIQUID-DISPENSING DEVICE.

1,221,288. Specification of Letters Patent. Patented Apr. 3, 1917.

Application filed February 4, 1916. Serial No. 76,100.

*To all whom it may concern:*

Be it known that I, ORPHA P. CANADAY, a citizen of the United States, residing at Fort Wayne, in the county of Allen and State of Indiana, have invented new and useful Improvements in Liquid-Dispensing Devices, of which the following is a specification.

The invention relates to devices for dispensing liquids. The object of the invention is to provide a simply and cheaply constructed device by which liquids of various consistencies may be dispensed in measured quantities.

In the accompanying drawings I have illustrated one form of the invention, in which drawings—

Figure 1 is a side elevational view of the invention applied to a portable outfit; Fig. 2 a horizontal cross-section of the three-way valve; Fig. 3 a view of the invention as applied to a distribution system.

Referring to the drawings 10 is a suitable storage tank mounted upon two wheels 11 and having a leg 12 by which the outfit is supported when at rest. A handle 13 secured to band 14 which encircles and is secured to the tank, enables the user to tilt the outfit for moving it about on wheels 11. 15 is a suitable pressure gage and 16 is a suitable connection through which air under pressure is supplied to the tank. The liquid or grease to be dispensed is inserted through an opening adapted to be closed by cap 17. A connection 18 is provided in the top of the tank and a connection 19 is provided in the bottom of the tank. Pipe 20 is attached to connection 18 and is connected to valve 21, the stem 22 of which preferably projects downwardly and is secured to the upper end of rod 23, the rod having a handle 40 secured thereto. An air vent 24 is provided in the valve casing, the purpose of which will be explained hereafter. Pipe 25 is attached to connection 19 and is connected to branch 26 of three-way valve 27. A suitable cock 28 is connected to branch 29 of valve 27 to which cock a hose 30 is attached. Pipe 31 is connected to branch 32 of valve 27 and to the bottom of cylinder 33. Pipe 34 is connected to valve 21 and to the top of cylinder 33.

Cylinder 33 is the measuring means, its capacity being predetermined. Within the cylinder is a floating plunger 35 which is packed so that it shall be double-acting. Rod 36 of the plunger passes through a suitable stuffing box 37 in the top of the cylinder and it is provided, near its upper end, with a finger or index 38 which, as the rod is reciprocated, will travel over a scale 39, the scale being graduated to indicate quantities of liquid, as gallons and fractions of gallons, pounds and fractions of pounds, etc.

The plug 41 of the three-way valve 27 (Fig. 2) is provided with two passageways 42 and 43 and they are so arranged that when the plug is rotated to cause either one of them to connect branch 26 to branch 32, or branch 32 to branch 29 of the valve, the other passageway will be closed at one end by the wall 44 of the valve casing.

The two valves 21 and 27 are so arranged and connected by rod 23 that when the former is closed the latter provides communication between the tank and the cylinder, passageway 42 connecting branch 26 to branch 32 of the valve and passageway 43 being closed by wall 44 of the valve casing. This situation of the valves is illustrated in Fig. 1 and is their normal position.

In operation, the tank is filled to a proper height with the liquid to be dispensed and the space above the liquid supplied with air under the desired pressure, cylinder 33 having been emptied by a previous operation. Plunger 35 is at the lower end or bottom of the cylinder; valve 21 is open and valve 27 connects cock 28 to pipe 31. The operator rotates rod 23 and the valves a quarter turn thereby restoring the valves to normal position (Fig. 1). The air under pressure in the tank forces the liquid through valve 27 into cylinder 33 and drives the piston to the upper end of the cylinder and fills the latter, the air above the piston escaping through vent 24 in valve 21, which valve is now closed. When a quantity of the liquid is desired the operator rotates rod 23 a quarter turn thereby opening valve 21, closing the communication through valve 27 between the tank and the cylinder and establishing communication between the cock and the cylinder. The air under pressure in the tank then passes into cylinder 33 above plunger 35 and forces the plunger downwardly, which causes the liquid to discharge from the cock or the hose. When the index has indicated the quantity of liquid desired, or if the cylinder has been emptied, the operator again restores the valves to normal position and the liquid in the tank is again forced into the cylinder.

In this manner grease and heavy oils may be as readily dispensed as light or volatile oils.

In Fig. 3 I have illustrated a distribution system in which one or more cylinders 33 are placed at points remote from the storage tank 50 which may be buried in the ground. The cylinders may be placed, for example, on different floors of a building or at various places on the same floor. The air line 51 is connected to the top of the storage tank and is led to each of the valves 21. The liquid conduit 52 leads from the storage tank to each of the valves 27, the valves being connected to the cylinder and operatively connected together by rods 23 as before. In case volatile oils are to be dispensed the air line instead of being connected to tank 50, is connected to a tank 53 which is supplied with air under pressure, which tank is connected by pipe 54 to the top of the storage tank, a suitable check valve 55 being provided in the pipe to prevent the escape of the vapor in the storage tank into the tank 53. Liquid is supplied to tank 50 through a suitable connection 56. Each of the cylinders and the valves for each operate as above described.

In the above description and in the claims I use the word "liquid" in the sense of any substance which may be handled by the mechanism and put in motion by air under pressure.

What I claim is:

1. The combination with a storage tank for liquid, of a measuring cylinder having communication with the tank, a valve to control the latter communication, means for admitting air under pressure into the tank for forcing the liquid therefrom and into the cylinder, a floating piston within the cylinder adapted to be reciprocated in one direction by the incoming liquid, valve controlled means connected to the cylinder for admitting air under pressure into the cylinder for reciprocating the piston in the opposite direction to cause the liquid in the cylinder to discharge therefrom in measured quantities.

2. The combination with a tank for the storage of liquid having means for admitting therein air under pressure by which the liquid is discharged therefrom, of a measuring cylinder having communication at one end with the storage tank, a valve to control the latter communication, means connected to the opposite end of the cylinder for supplying air under pressure to the cylinder, a valve to control the said supply of air, a piston within the cylinder adapted to be reciprocated in one direction by the incoming liquid and to be reciprocated in the opposite direction for discharging the liquid from the cylinder by the air under pressure, means carried by the piston and coöperating with a fixed scale for indicating quantities of liquid discharged from the cylinder and means connecting the two valves for operating them simultaneously.

3. The combination with a storage tank for liquid, having means connected thereto for supplying air under pressure to the same, a cylinder having connection with the tank and adapted to be supplied with liquid therefrom, a piston in the cylinder, a three-way valve to control the supply of liquid to the cylinder and the discharge of the same therefrom, means connected to the cylinder for supplying air under pressure thereto for reciprocating the piston in one direction, a valve to control said connection and means connecting the two valves for operating them simultaneously.

In witness whereof I have hereunto subscribed my name this 24th day of January, 1916.

ORPHA P. CANADAY.